United States Patent
Aoyama et al.

(10) Patent No.: US 11,014,390 B2
(45) Date of Patent: May 25, 2021

(54) LUMINESCENT MEDIUM AND METHOD FOR READING LUMINESCENT MEDIUM

(71) Applicant: Dai Nippon Printing Co., Ltd., Tokyo (JP)

(72) Inventors: Yuko Aoyama, Tokyo (JP); Jun Sato, Tokyo (JP); Tsuyoshi Yamauchi, Tokyo (JP); Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 277 days.

(21) Appl. No.: 15/529,603

(22) PCT Filed: Jan. 7, 2016

(86) PCT No.: PCT/JP2016/050374
§ 371 (c)(1),
(2) Date: May 25, 2017

(87) PCT Pub. No.: WO2016/111334
PCT Pub. Date: Jul. 14, 2016

(65) Prior Publication Data
US 2017/0259600 A1    Sep. 14, 2017

(30) Foreign Application Priority Data

Jan. 9, 2015   (JP) .............................. JP2015-003509

(51) Int. Cl.
*B41M 3/14*       (2006.01)
*B42D 25/387*    (2014.01)
(Continued)

(52) U.S. Cl.
CPC ............. *B41M 3/144* (2013.01); *B42D 25/23* (2014.10); *B42D 25/24* (2014.10); *B42D 25/29* (2014.10);
(Continued)

(58) Field of Classification Search
CPC ........ B41M 3/144; B42D 25/23; B42D 25/24; B42D 25/29; B42D 25/378; B42D 25/382;
(Continued)

(56) References Cited

U.S. PATENT DOCUMENTS

2009/0258200 A1   10/2009   Scholz et al.
2013/0127151 A1    5/2013   Sekine et al.
2017/0036477 A1    2/2017   Scholz et al.

FOREIGN PATENT DOCUMENTS

EP       1805727 A       7/2007
JP       50-006410 A1    1/1975
(Continued)

OTHER PUBLICATIONS

Machine Translation of WO 2014-076049 (Year: 2014).*
(Continued)

*Primary Examiner* — Lucas A Stelling
*Assistant Examiner* — Sathavaram I Reddy
(74) *Attorney, Agent, or Firm* — Burr & Brown, PLLC (57) ABSTRACT

There is provided a luminescent medium which requires difficult analysis of light emitted from a luminescent material of the medium. A luminescent medium includes a substrate, and a luminescent material comprising a first luminescent material which, when irradiated with visible light, infrared light or ultraviolet light, emits first infrared light "a", and a second luminescent material which, when irradiated with visible light, infrared light or ultraviolet light, emits second infrared light "b". The first luminescent material is formed in a first planar area, and the second luminescent material is formed in a second planar area. The first planar area and the second planar area overlap each other, forming an overlapping planar area in which the luminescent materials each have a concentration gradation.

8 Claims, 4 Drawing Sheets

(51) Int. Cl.
- *B42D 25/382* (2014.01)
- *G07D 7/12* (2016.01)
- *G01N 21/64* (2006.01)
- *G07D 7/1205* (2016.01)
- *B42D 25/378* (2014.01)
- *B42D 25/29* (2014.01)
- *B42D 25/23* (2014.01)
- *B42D 25/24* (2014.01)

(52) U.S. Cl.
CPC ......... *B42D 25/378* (2014.10); *B42D 25/382* (2014.10); *B42D 25/387* (2014.10); *G01N 21/643* (2013.01); *G07D 7/12* (2013.01); *G07D 7/1205* (2017.05); *G01N 2021/6419* (2013.01)

(58) Field of Classification Search
CPC ...... B42D 25/387; G07D 7/12; G07D 7/1205; G01N 21/643; G01N 2021/6419
See application file for complete search history.

(56) References Cited

FOREIGN PATENT DOCUMENTS

| | | |
|---|---|---|
| JP | H09-020060 A1 | 1/1997 |
| JP | 2005-262681 A1 | 9/2005 |
| JP | 2009-510239 A1 | 3/2009 |
| JP | 2012-051362 A1 | 3/2012 |
| JP | 5541583 B2 | 7/2014 |
| WO | 2007/039288 A1 | 4/2007 |
| WO | 2009/040126 A1 | 4/2009 |
| WO | 2013/033009 A1 | 3/2013 |
| WO | 2014/076049 A1 | 5/2014 |

OTHER PUBLICATIONS

Extended European Search Report (Application No. 16735073.5) dated Aug. 20, 2018.
English translation of International Preliminary Report on Patentability (Chapter I) (Application No. PCT/JP2016/050374) dated Jul. 20, 2017, 6 pages.
International Search Report and Written Opinion (Application No. PCT/JP2016/050374) dated Mar. 29, 2016.
Japanese Office Action (Application No. 2016-568745) dated Oct. 11, 2019 (with English translation).
Japanese Office Action (Application No. 2016-568745) dated Apr. 28, 2020 (with English translation).

* cited by examiner

LUMINESCENT MEDIUM AND METHOD FOR READING LUMINESCENT MEDIUM

TECHNICAL FIELD

The present invention relates to a luminescent medium which, when irradiated with infrared light, ultraviolet light or visible light, emits two infrared lights having different wavelength ranges or two ultraviolet lights having different wavelength ranges, and to a method for reading the luminescent medium.

BACKGROUND ART

Luminescent media, comprising a substrate and a luminescent material provided on the substrate, have been developed in the field of media for which prevention of counterfeiting is required, such as securities including cash vouchers and prepaid cards, identification cards including driver's license cards, etc. in order to enhance the security of such media. When such a luminescent medium is irradiated with invisible light, it emits visible lights of different colors which can be read. This can prevent the medium from being easily counterfeited e.g. by using a common color printer.

In order to further enhance the counterfeiting prevention effect, a demand exists these days for the development of a luminescent medium which requires more difficult analysis of light emitted from a luminescent material of the medium.

PRIOR ART DOCUMENT

Patent Document

Patent document 1: Japanese Patent No. 5541583

SUMMARY OF THE INVENTION

Problems to be Solved by the Invention

The present invention has been made in view of the above situation. It is therefore an object of the present invention to provide a luminescent medium which requires more difficult analysis of light emitted from a luminescent material of the medium, and to provide a method for reading the luminescent medium.

Means for Solving the Problems

The present invention provides a luminescent medium comprising: a substrate; and a luminescent material provided on the substrate, wherein the luminescent material comprises a first luminescent material which, when irradiated with visible light, infrared light or ultraviolet light, emits first infrared light having a first wavelength range, and a second luminescent material which, when irradiated with visible light, infrared light or ultraviolet light, emits second infrared light having a second wavelength range, wherein the first wavelength range of the first infrared light from the first luminescent material differs from the second wavelength range of the second infrared light from the second luminescent material, and the first luminescent material is disposed in a first planar area on the substrate, and the second luminescent material is disposed in a second planar area on the substrate, and wherein the first planar area and the second planar area overlap each other, forming an overlapping planar area of the luminescent material comprising the first luminescent material and the second luminescent material, and the concentration of the first luminescent material in the luminescent material of the overlapping planar area gradually decreases in a direction from the first planar area toward the second planar area, while the concentration of the second luminescent material in the luminescent material of the overlapping planar area gradually decreases in a direction from the second planar area toward the first planar area.

In an embodiment of the present invention, the first luminescent material and the second luminescent material are formed integrally in a planar form.

In an embodiment of the present invention, the first luminescent material and the second luminescent material are formed in the form of dots.

The present invention also provides a luminescent medium comprising: a substrate; and a luminescent material provided on the substrate, wherein the luminescent material comprises a first luminescent material which, when irradiated with visible light or ultraviolet light, emits first ultraviolet light having a first wavelength range, and a second luminescent material which, when irradiated with visible light or ultraviolet light, emits second ultraviolet light having a second wavelength range, wherein the first wavelength range of the first ultraviolet light from the first luminescent material differs from the second wavelength range of the second ultraviolet light from the second luminescent material, and the first luminescent material is disposed in a first planar area on the substrate, and the second luminescent material is disposed in a second planar area on the substrate, and wherein the first planar area and the second planar area overlap each other, forming an overlapping planar area of the luminescent material comprising the first luminescent material and the second luminescent material, and the concentration of the first luminescent material in the luminescent material of the overlapping planar area gradually decreases in a direction from the first planar area toward the second planar area, while the concentration of the second luminescent material in the luminescent material of the overlapping planar area gradually decreases in a direction from the second planar area toward the first planar area.

In an embodiment of the present invention, the first luminescent material and the second luminescent material are formed integrally in a planar form.

In an embodiment of the present invention, the first luminescent material and the second luminescent material are formed in the form of dots.

The present invention also provides a method for reading a luminescent medium, comprising the steps of: preparing a luminescent medium comprising: a substrate; and a luminescent material provided on the substrate, wherein the luminescent material comprises a first luminescent material which, when irradiated with visible light, infrared light or ultraviolet light, emits first infrared light having a first wavelength range, and a second luminescent material which, when irradiated with visible light, infrared light or ultraviolet light, emits second infrared light having a second wavelength range, wherein the first wavelength range of the first infrared light from the first luminescent material differs from the second wavelength range of the second infrared light from the second luminescent material, and the first luminescent material is disposed in a first planar area on the substrate, and the second luminescent material is disposed in a second planar area on the substrate, and wherein the first planar area and the second planar area overlap each other, forming an overlapping planar area of the luminescent material comprising the first luminescent material and the second luminescent material, and the concentration of the first luminescent material in the luminescent material of the overlapping planar area gradually decreases in a direction from the first planar area toward the second planar area, while the concentration of the second luminescent material in the luminescent material of the overlapping planar area gradually decreases in a direction from the second planar area toward the first planar area; irradiating the luminescent medium with visible light, infrared light or ultraviolet light, emitted from an irradiation section, to cause the first luminescent material to emit the first infrared light having the first wavelength range and to cause the second luminescent material to emit the second infrared light having the second wavelength range; and reading the first infrared light and the second infrared light by an infrared detection section while moving the infrared detection section, which reads the first wavelength range of the first infrared light and the second wavelength range of the second infrared light, over the substrate in a direction from one of the first planar area and the second planar area toward the other.

The present invention also provides a method for reading a luminescent medium, comprising the steps of: preparing a luminescent medium comprising: a substrate; and a luminescent material provided on the substrate, wherein the luminescent material comprises a first luminescent material which, when irradiated with visible light or ultraviolet light, emits first ultraviolet light having a first wavelength range, and a second luminescent material which, when irradiated with visible light or ultraviolet light, emits second ultraviolet light having a second wavelength range, wherein the first wavelength range of the first ultraviolet light from the first luminescent material differs from the second wavelength range of the second ultraviolet light from the second luminescent material, and the first luminescent material is disposed in a first planar area on the substrate, and the second luminescent material is disposed in a second planar area on the substrate, and wherein the first planar area and the second planar area overlap each other, forming an overlapping planar area of the luminescent material comprising the first luminescent material and the second luminescent material, and the concentration of the first luminescent material in the luminescent material of the overlapping planar area gradually decreases in a direction from the first planar area toward the second planar area, while the concentration of the second luminescent material in the luminescent material of the overlapping planar area gradually decreases in a direction from the second planar area toward the first planar area; irradiating the luminescent medium with visible light or ultraviolet light to cause the first luminescent material to emit the first ultraviolet light having the first wavelength range and to cause the second luminescent material to emit the second ultraviolet light having the second wavelength range; and reading the first ultraviolet light and the second ultraviolet light by an ultraviolet detection section while moving the ultraviolet detection section, which reads the first wavelength range of the first ultraviolet light and the second wavelength range of the second ultraviolet light, over the substrate in a direction from one of the first planar area and the second planar area toward the other.

Advantageous Effects of the Invention

The present invention can provide a luminescent medium which requires difficult analysis of light emitted from a luminescent material of the medium, and can provide a method for reading the luminescent medium.

DETAILED DESCRIPTION OF THE INVENTION

First Embodiment

A first embodiment of the present invention will now be described with reference to FIGS. 1 through 3. At the outset, the overall construction of a counterfeiting preventive medium 10, comprised of a luminescent medium according to the present invention, will be described.

<Counterfeiting Preventive Medium>

Figure 1:
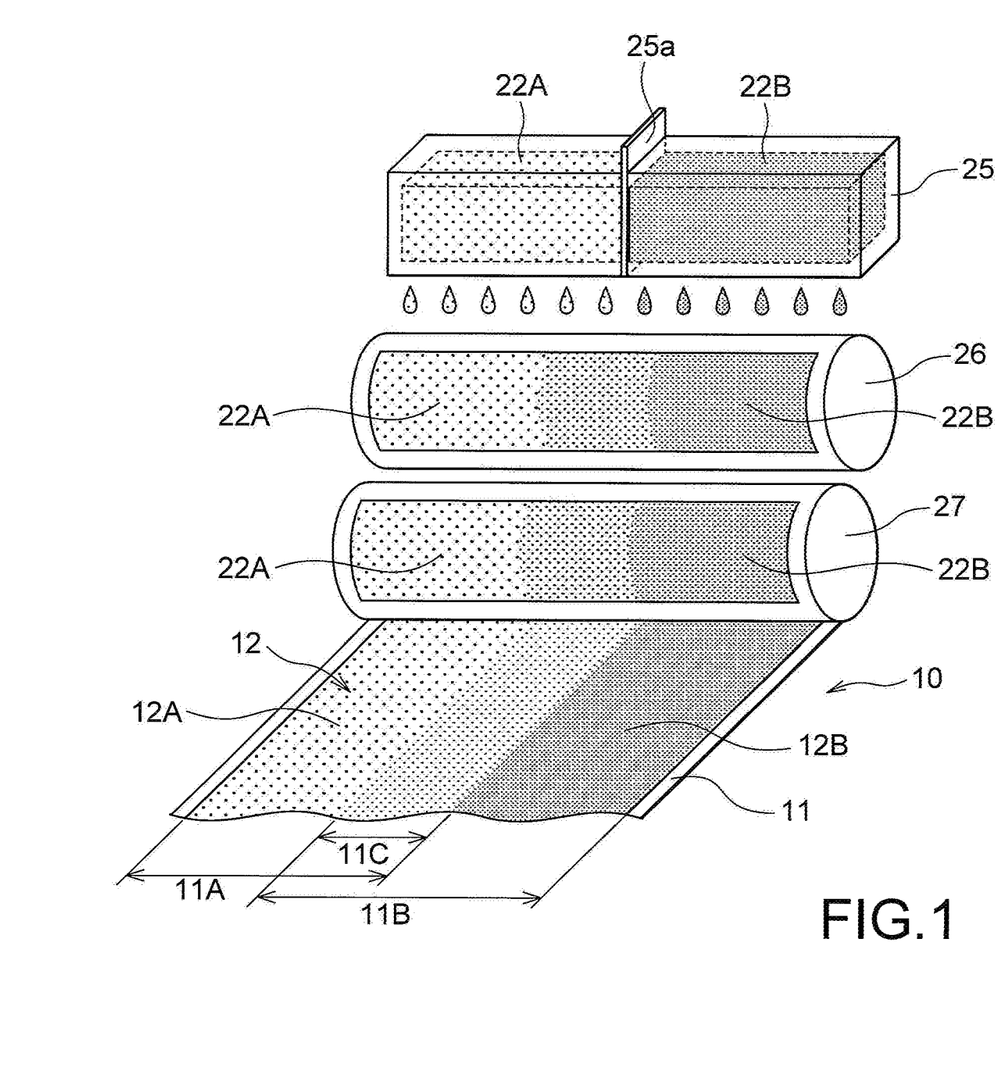
FIG. 1 is a diagram illustrating a method for producing a luminescent medium in a first embodiment of the present invention.

FIG. 1 is a diagram showing a gift certificate (securities) as an example of the counterfeiting preventive medium 10 according to the first embodiment. As shown in FIG. 1, the counterfeiting preventive medium 10 comprises a substrate 11 and a luminescent material 12 formed on the substrate 11. In this embodiment the luminescent material 12 serves as an authenticity determination image for determining the authenticity of the counterfeiting preventive medium 10, as will be described in detail below. As shown in FIG. 1, the luminescent material 12 consists of a first luminescent material 12A which, when irradiated with visible light or infrared light, emits first infrared light "a" having a first wavelength range W1, and a second luminescent material 12B which, when irradiated with visible light or infrared light, emits second infrared light "b" having a second wavelength range W2.

Figure 2:
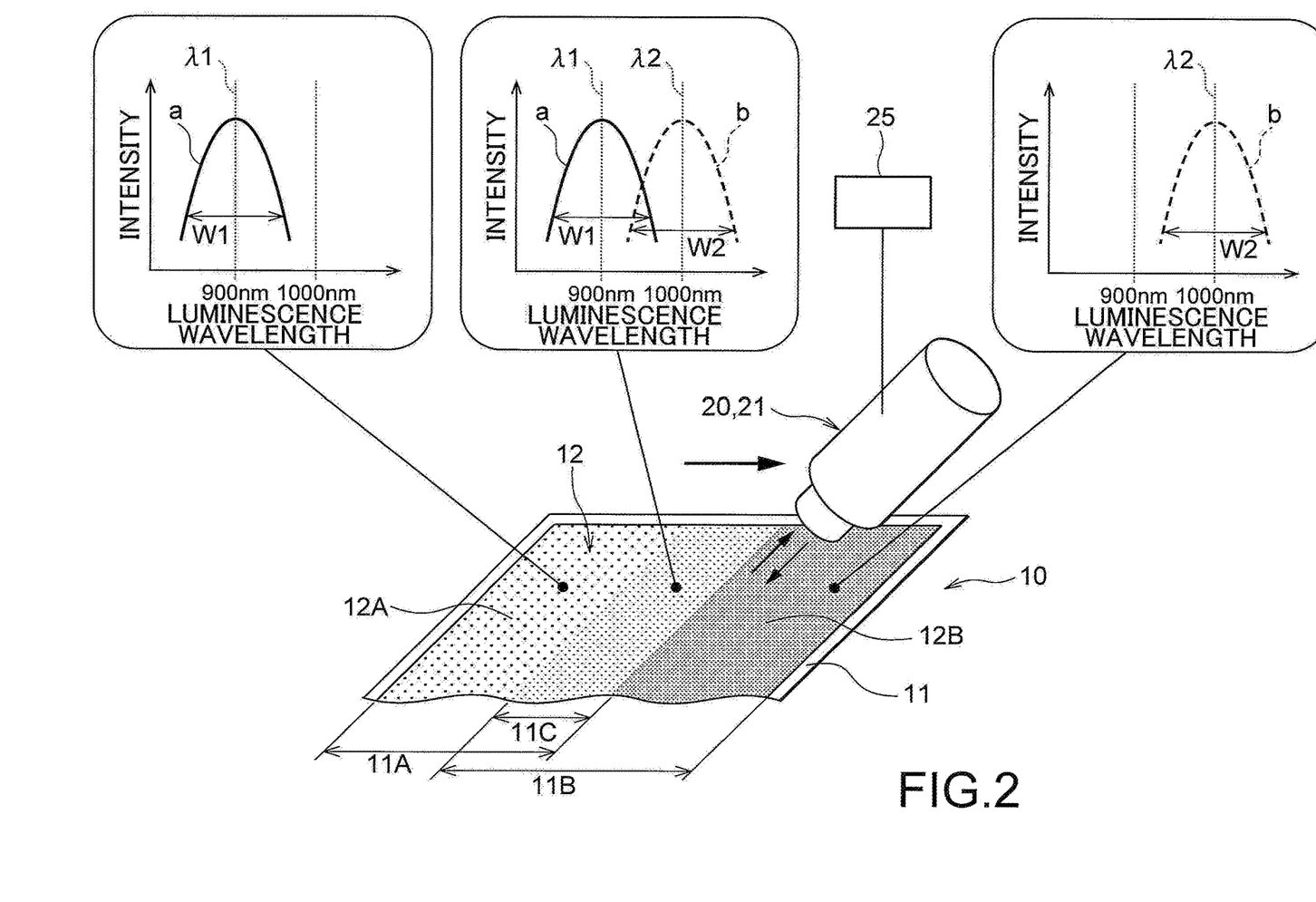
FIG. 2 is a schematic diagram illustrating a method for reading a luminescent medium in the first embodiment of the present invention.

As shown in FIG. 2, the first wavelength range W1 of the first infrared light "a" emitted from the first luminescent material 12A differs from the second wavelength range W2 of the second infrared light "b" emitted from the second luminescent material 12B.

As shown in FIG. 1, the first luminescent material 12A is disposed in a first planar area 11A on the substrate 11, and the second luminescent material 12B is disposed in a second planar area 11B on the substrate 11. The first planar area 11A and the second planar area 11B partially overlap each other, forming an overlapping planar area 11C composed of the luminescent material 12 consisting of the first luminescent material 12A and the second luminescent material 12B.

Referring to FIG. 1, the concentration of the first luminescent material 12A in the luminescent material 12 of the overlapping planar area 11C gradually decreases in a direction from the first planar area 11A toward the second planar area 11B, while the concentration of the second luminescent material 12B in the luminescent material 12 of the overlapping planar area 11C gradually decreases in a direction from the second planar area 11B toward the first planar area 11A.

Thus, the first luminescent material 12A and the second luminescent material 12B in the luminescent material 12 of the overlapping planar area 11C each have a concentration gradation.

The material of the substrate 11 for use in the counterfeiting preventive medium 10 is not particularly limited, and may be appropriately selected depending on the type of securities composed of the counterfeiting preventive medium 10. For example, white polyethylene terephthalate, having excellent printability and processability, may be used as the material of the substrate 11. The thickness of the substrate 11 may be appropriately set depending on the type of securities composed of the counterfeiting preventive medium 10.

The size of the luminescent material 12 is not particularly limited, and may be appropriately set depending on the ease of authenticity determination, the required determination accuracy, etc. For example, the longitudinal length and the lateral length of the area occupied by the luminescent material 12 may be in the range of 1 to 210 mm and in the range of 1 to 300 mm, respectively. In FIG. 1, the luminescent material 12 is depicted in an enlarged and exaggerated manner.

<Luminescent Material>

The luminescent material 12 will now be described in greater detail with reference to FIGS. 1 and 2. FIG. 1 is a diagram illustrating the luminescent medium 10, and FIG. 2 is a diagram illustrating a method for reading the luminescent medium 10.

As described above, the luminescent material 12, provided on the substrate 11, comprises the first luminescent material 12A which, when irradiated with visible light, infrared light or ultraviolet light, emits the first infrared light "a" having the first wavelength range W1, and the second luminescent material 12B which, when irradiated with visible light, infrared light or ultraviolet light, emits the second infrared light "b" having the second wavelength range W2.

The first luminescent material 12A comprises a colorless first luminescent material ink 22A which, when irradiated with visible light, infrared light or ultraviolet light, emits the first infrared light "a" but does not emit visible light. The first luminescent material ink 22A may contain a desired amount of a pigment which makes it possible to easily check the position of the first luminescent material 12A and identify the infrared detection area and, in addition, to facilitate the production of the first luminescent material 12A. The pigment is fluorescent, and therefore is visible.

Similarly, the second luminescent material 12B comprises a colorless second luminescent material ink 22B which, when irradiated with visible light, infrared light or ultraviolet light, emits the second infrared light "b" but does not emit visible light. The second luminescent material ink 22B may contain a desired amount of a pigment which makes it possible to easily check the position of the second luminescent material 12B and identify the infrared detection area and, in addition, to facilitate the production of the second luminescent material 12B. The pigment is fluorescent, and therefore is visible.

By thus producing the first luminescent material 12A using the first luminescent material ink 22A containing a pigment and producing the second luminescent material 12B using the second luminescent material ink 22B containing a pigment, the first luminescent material 12A can emit the first infrared light "a" having the first wavelength range W1, and the second luminescent material 12B can emit the second infrared light "b" having the second wavelength range W2 when the first luminescent material 12A and the second luminescent material 12B are irradiated with visible light, infrared light or ultraviolet light.

The first wavelength range W1 of the first infrared light "a" differs from the second wavelength range W2 of the second infrared light "b".

The first wavelength range W1 of the first infrared light "a" has, for example, a middle point of 900 nm and a width of about 20 nm (see FIG. 2). The second wavelength range W2 of the second infrared light "b" has, for example, a middle point of 1000 nm and a width of about 100 to 200 nm (see FIG. 2).

The luminescent medium 10 having the above construction can be produced by using a rainbow printing method as illustrated in FIG. 1.

As shown in FIG. 1, an ink vessel 25 whose interior is separated by a partition 25a is prepared, and the first luminescent material ink 22A is put in one of the partitioned chambers of the ink vessel 25, and the second luminescent material ink 22B is put in the other chamber of the ink vessel 25.

Next, the first luminescent material ink 22A and the second luminescent material ink 22B are supplied from the ink vessel 25 onto a roller 26, and the inks are then transferred onto a plate cylinder 27.

During the above operation, part of the first luminescent material ink 22A and part of the second luminescent material ink 22B are mixed in an area, corresponding to the overlapping planar area 11C, on the roller 26.

Next, the first luminescent material ink 22A and the second luminescent material ink 22B on the plate cylinder 27 are solidly printed onto the substrate 11 and formed integrally. The first luminescent material ink 22A is printed in the first planar area 11A on the substrate 11, and the second luminescent material ink 22B is printed in the second planar area 11B on the substrate 11 so that the first luminescent material 12A is disposed in the first planar area 11A on the substrate 11, and the second luminescent material 12B is disposed in the second planar area 11B on the substrate 11.

The first planar area 11A and the second planar area 11B partially overlap each other, forming the overlapping planar area 11C of the luminescent material 12 consisting of the first luminescent material 12A and the second luminescent material 12B. The concentration of the first luminescent material 12A in the luminescent material 12 of the overlapping planar area 11C gradually decreases in a direction from the first planar area 11A toward the second planar area 11B, while the concentration of the second luminescent material 12B in the luminescent material 12 of the overlapping planar area 11C gradually decreases in a direction from the second planar area 11B toward the first planar area 11A. Thus, the first luminescent material 12A and the second luminescent material 12B in the luminescent material 12 of the overlapping planar area 11C each have a concentration gradation.

The operation of this embodiment having the above-described construction, i.e. a method for reading the luminescent medium, will now be described with reference to FIG. 2.

First, the luminescent medium 10, comprising the substrate 11 and the luminescent material 12 consisting of the first luminescent material 12A and the second luminescent material 12B and provided on the substrate 11, is prepared.

Next, the luminescent medium 10 is irradiated with visible light, infrared light or ultraviolet light, emitted from an irradiation section 20. Upon the light irradiation, the first luminescent material 12A emits the first infrared light "a" having the first wavelength range W1 and, at the same time, the second luminescent material 12B emits the second infrared light "b" having the second wavelength range W2.

The first infrared light "a" emitted from the first luminescent material 12A and the second infrared light "b" emitted from the second luminescent material 12B are detected with an infrared detection section 21 provided integrally with the irradiation section 20.

The infrared detection section 21 can read the first wavelength range W1 of the first infrared light "a" and the second wavelength range W2 of the second infrared light "b". In particular, the infrared detection section 21 has, as detection wavelengths, a wavelength λ1 corresponding to the first wavelength range W1 of the first infrared light "a" and a wavelength λ2 corresponding to the second wavelength range W2 of the second infrared light "b", and therefore can read both the first infrared light "a" emitted from the first luminescent material 12A and the second infrared light "b" emitted from the second luminescent material 12B. The luminescence spectra read by the infrared detection section 21 are sent to a controller 30.

The controller 30 horizontally moves the irradiation section 20 and the infrared detection section 21 together over the substrate 11 in a direction from one of the first planar area 11A and the second planar area 11B toward the other, e.g. from the first planar area 11A toward the second planar area 11B.

While the controller 30 is thus horizontally moving the irradiation section 20 and the infrared detection section 21 together over the substrate 11, the infrared detection section 21 reads the first infrared light "a" and the second infrared light "b" in a continuous manner, and the luminescence spectra read by the infrared detection section 21 are continuously sent to the controller 30.

Figure 3:
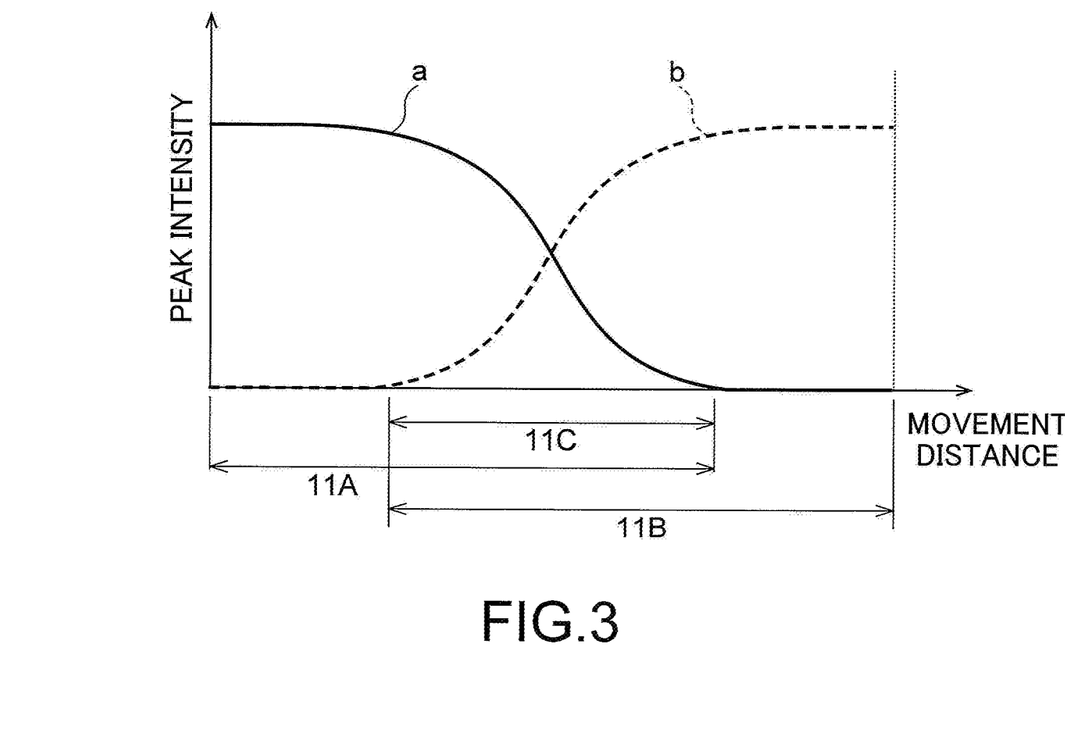
FIG. 3 is a diagram illustrating the peak intensity of a luminescent medium in the first embodiment of the present invention.

FIG. 3 is a diagram illustrating the peak intensity of the first infrared light "a" and the peak intensity of the second infrared light "b" of the luminescence spectra sent to the controller 30.

The abscissa axis in FIG. 3 represents the movement distance of the irradiation section 20 and the infrared detection section 21.

As shown in FIG. 3, the peak intensity of the first infrared light "a" of the luminescence spectra is at a maximum in the first planar area 11A, and the peak intensity of the first infrared light "a" gradually decreases in the overlapping planar area 11C.

On the other hand, the peak intensity of the second infrared light "b" of the luminescence spectra is at a maximum in the second planar area 11B, and the peak intensity of the second infrared light "b" gradually decreases in the overlapping planar area 11C.

The controller 30 has pre-stored reference peak intensities of the first infrared light "a" and the second infrared light "b" of the luminescence spectra of the authentic luminescent medium 10, and performs an authenticity determination for the luminescent medium 10 by comparing the peak intensities of the luminescence spectra sent from the infrared detection section 21 with the pre-stored reference peak intensities.

As described above, according to this embodiment, the first luminescent material 12A and the second luminescent material 12B each have a concentration gradation in the overlapping area between the first planar area 11A and the second planar area 11B. This makes difficult the analysis of the lights emitted from the first luminescent material 12A and the second luminescent material 12B, thus making it possible to obtain a counterfeiting preventive medium having a high counterfeiting prevention effect.

Further, since the first luminescent material 12A and the second luminescent material 12B comprise the colorless luminescent material inks which, when irradiated with visible light, infrared light or ultraviolet light, emit the infrared lights but do not emit visible light, the first planar area 11A where the first luminescent material 12A is provided and the second planar area 11B where the second luminescent material 12B is provided are not visible. Therefore, the first luminescent material 12A and the second luminescent material 12B can be disposed without the need for consideration of interference with a printed design, characters, etc. provided on the counterfeiting preventive medium 10.

Second Embodiment

A second embodiment of the present invention will now be described with reference to FIG. 4.

In the above-described embodiment the first luminescent material 12A and the second luminescent material 12B are formed on the substrate 11 by rainbow printing in such a manner that the first luminescent material 12A and the second luminescent material 12B each have a concentration gradation in the overlapping planar area 11C. However, it is also possible to form the first luminescent material 12A and the second luminescent material 12B in the form of dots on the substrate 11 in such a manner that the first luminescent material 12A and the second luminescent material 12B each have a concentration gradation in the overlapping planar area 11C.

Figure 4:
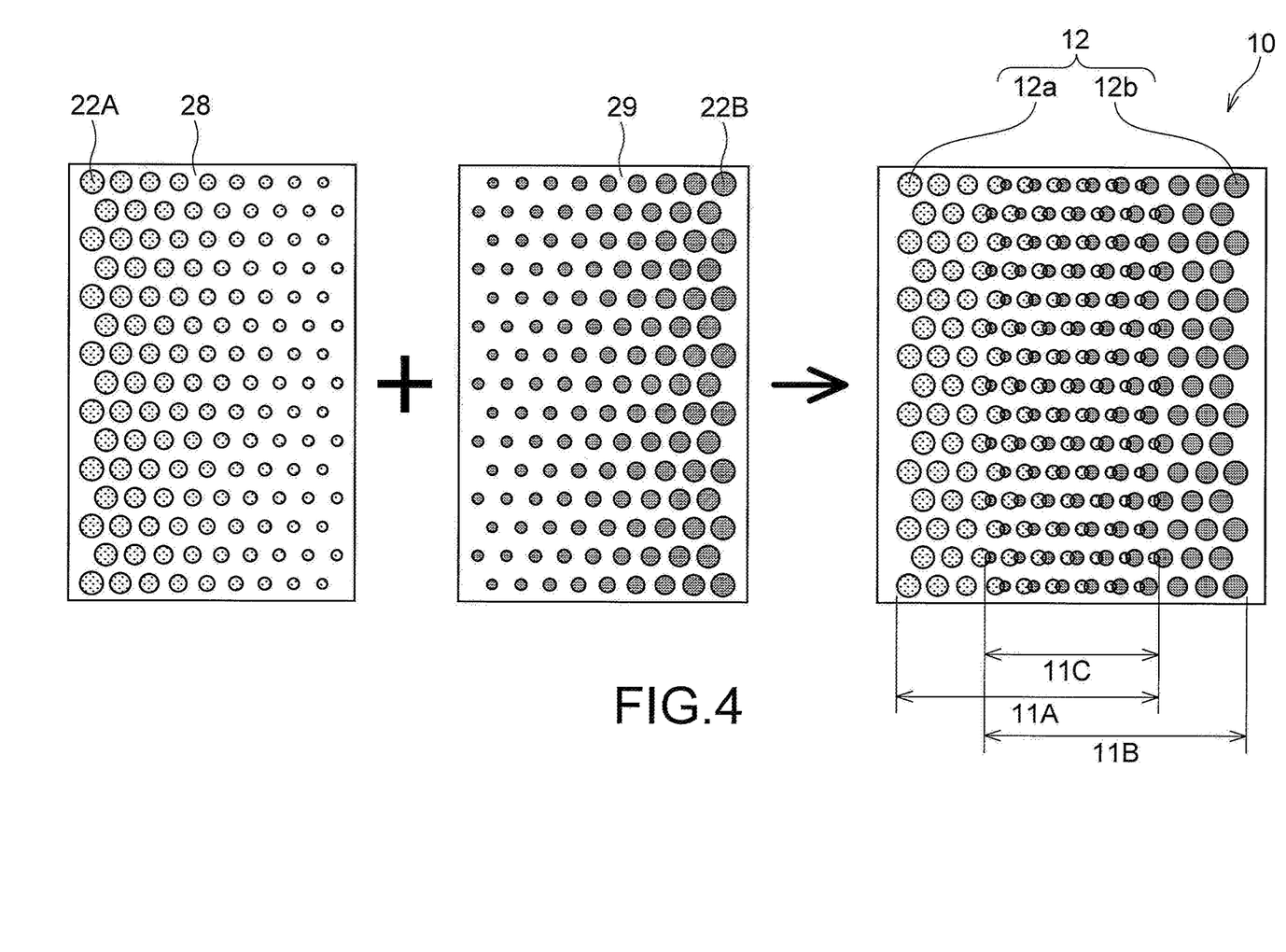
FIG. 4 is a diagram illustrating a method for producing a luminescent medium in a second embodiment of the present invention.

For the second embodiment shown in FIG. 4, the same symbols (reference numerals) as used for the first embodiment shown in FIGS. 1 through 3 are used to refer to the same components or elements, and a detailed description thereof is omitted.

As show in FIG. 4, a first plate 28 for producing the first luminescent material 12A and to which the first luminescent material ink 22A has been applied in the form of dots, and a second plate 29 for producing the second luminescent material 12B and to which the second luminescent material ink 22B has been applied in the form of dots, are prepared first.

Next, the first luminescent material ink 22A is printed onto the substrate 11 by using the first plate 28 having the first luminescent material ink 22A, thereby forming the first luminescent material 12A in the form of dots in a first planar area 11A on the substrate 11.

Next, the second luminescent material ink 22B is printed onto the substrate 11 by using the second plate 29 having the second luminescent material ink 22B, thereby forming the second luminescent material 12B in the form of dots in a second planar area 11B on the substrate 11.

The first luminescent material 12A in the form of dots is thus disposed in the first planar area 11A on the substrate 11, and the second luminescent material 12B in the form of dots is disposed in the second planar area 11B on the substrate 11.

The first planar area 11A and the second planar area 11B partially overlap each other, forming an overlapping planar area 11C of the luminescent material 12 consisting of the first luminescent material 12A and the second luminescent material 12B. The concentration (concentration of dots) of the first luminescent material 12A in the luminescent material 12 of the overlapping planar area 11C gradually decreases in a direction from the first planar area 11A toward the second planar area 11B, while the concentration (concentration of dots) of the second luminescent material 12B in the luminescent material 12 of the overlapping planar area 11C gradually decreases in a direction from the second planar area 11B toward the first planar area 11A. Thus, the first luminescent material 12A and the second luminescent material 12B in the luminescent material 12 of the overlapping planar area 11C each have a concentration gradation.

In the second embodiment, the luminescence spectra of the infrared lights emitted from the first luminescent material 12A and the second luminescent material 12B can be read by the same reading method as in the first embodiment shown in FIGS. 1 through 3.

In the second embodiment, the first planar area 11A and the second planar area 11B are produced in separate steps and superimposed together. Therefore, the concentration (concentration of dots) of the first luminescent material 12A in the first planar area 11A and the concentration (concentration of dots) of the second luminescent material 12B in the second planar area 11B can be designed independently. Thus, in the second embodiment, the concentration gradient of the first luminescent material 12A in the first planar area 11A may be made different from the concentration gradient of the second luminescent material 12B in the second planar area 11B.

Other Embodiments

In the above-described embodiments, when the luminescent material 12 of the luminescent medium 10 is irradiated with visible light or infrared light, the first luminescent material 12A of the luminescent material 12 emits the first infrared light "a" having the first wavelength range W1, and the second luminescent material 12B of the luminescent material 12 emits the second infrared light "b" having the second wavelength range W2. However, in an embodiment, the luminescent material 12 may comprise a first luminescent material 12A which, when irradiated with visible light or ultraviolet light, emits first ultraviolet light having a first wavelength range, and a second luminescent material 12B which, when irradiated with visible light or ultraviolet light, emits second ultraviolet light having a second wavelength range. The first wavelength range of the first ultraviolet light from the first luminescent material 12A differs from the second wavelength range of the second ultraviolet light from the second luminescent material 12B.

In the above-described embodiments, the first luminescent material 12A that emits the first infrared light "a" having the first wavelength range W1, and the second luminescent material 12B that emits the second infrared light "b" having the second wavelength range W2 are provided on the substrate 11. However, a third luminescent material that emits third infrared light having a third wavelength range, which differs from the first wavelength range W1 and the second wavelength range W2, may be additionally provided on the substrate 11.

This enables more difficult analysis of the lights emitted from the first luminescent material 12A, the second luminescent material 12B and the third luminescent material.

Though in the above-described embodiments the first planar area 11A where the first luminescent material 12A is disposed and the second planar area 11B where the second luminescent material 12B is disposed each have a rectangular shape, they may have other shapes, such as a circular shape, an elliptical shape, a triangular shape, etc. Further, it is possible to form the first planar area 11A in a pattern, and to dispose the second planar area 11B such that it surrounds the periphery of the first planar area 11A. It is also possible to dispose the second planar area 11B over the entire surface, except the first planar area 11A, of the counterfeiting preventive medium 10.

Though in the above-described embodiments the counterfeiting preventive medium 10 is a gift certificate (securities), the counterfeiting preventive medium 10 may be an identification card, such as a passport, driver's license card, etc.

DESCRIPTION OF THE SYMBOLS 10 counterfeiting preventive medium
11 substrate
11A first planar area
11B second planer area
12 luminescent material
12A first luminescent material
12B second luminescent material
20 irradiation section
21 infrared detection section
25 ink vessel
26 roller
27 plate cylinder
28 first plate
29 second plate
30 controller
a first infrared light
b second infrared light
λ1 detection wavelength
λ2 detection wavelength

The invention claimed is:
1. A luminescent medium comprising:
a substrate; and
a luminescent material on the substrate, wherein the luminescent material comprises a first luminescent material which, when irradiated with visible light, infrared light or ultraviolet light, emits first infrared light having a first wavelength range, and a second luminescent material which, when irradiated with visible light, infrared light or ultraviolet light, emits second infrared light having a second wavelength range, wherein the first wavelength range of the first infrared light from the first luminescent material differs from the second wavelength range of the second infrared light from the second luminescent material, and the first luminescent material is arranged in a first planar area on the substrate, and the second luminescent material is arranged in a second planar area on the substrate, wherein the first planar area and the second planar area partially overlap each other, with the luminescent material comprising the first luminescent material and the second luminescent material each arranged to have a concentration gradation, such that an overlapping planar area of the luminescent material is formed, wherein the concentration gradation of the first luminescent material in the luminescent material of the overlapping planar area gradually decreases in a direction from the first planar area toward the second planar area, while the concentration gradation of the second luminescent material in the luminescent material of the overlapping planar area gradually decreases in a direction from the second planar area toward the first planar area, and
wherein the first luminescent material and the second luminescent material comprise colorless luminescent material inks which, when irradiated with visible light, infrared light or ultraviolet light, emit the first and the second infrared lights but do not emit visible light.
2. The luminescent medium according to claim 1, wherein the first luminescent material and the second luminescent material are formed in a planar form.

3. The luminescent medium according to claim 1, wherein the first luminescent material and the second luminescent material are formed in the form of dots.

4. A luminescent medium comprising:
   a substrate; and
   a luminescent material on the substrate, wherein the luminescent material comprises a first luminescent material which, when irradiated with visible light or ultraviolet light, emits first ultraviolet light having a first wavelength range, and a second luminescent material which, when irradiated with visible light or ultraviolet light, emits second ultraviolet light having a second wavelength range, wherein the first wavelength range of the first ultraviolet light from the first luminescent material differs from the second wavelength range of the second ultraviolet light from the second luminescent material, and the first luminescent material is arranged in a first planar area on the substrate, and the second luminescent material is arranged in a second planar area on the substrate, wherein the first planar area and the second planar area partially overlap each other, with the luminescent material comprising the first luminescent material and the second luminescent material each arranged to have a concentration gradation, such that an overlapping planar area of the luminescent material is formed, and wherein the concentration gradation of the first luminescent material in the luminescent material of the overlapping planar area gradually decreases in a direction from the first planar area toward the second planar area, while the concentration gradation of the second luminescent material in the luminescent material of the overlapping planar area gradually decreases in a direction from the second planar area toward the first planar area, and wherein the first luminescent material and the second luminescent material comprise colorless luminescent material inks, which, when irradiated with visible light or ultraviolet light, emit the first and the second ultraviolet lights but do not emit visible light.

5. The luminescent medium according to claim 4, wherein the first luminescent material and the second luminescent material are formed in a planar form.

6. The luminescent medium according to claim 4, wherein the first luminescent material and the second luminescent material are formed in the form of dots.

7. A method for reading a luminescent medium, comprising the steps of:
   preparing a luminescent medium comprising: a substrate; and a luminescent material on the substrate, wherein the luminescent material comprises a first luminescent material which, when irradiated with visible light, infrared light or ultraviolet light, emits first infrared light having a first wavelength range, and a second luminescent material which, when irradiated with visible light, infrared light or ultraviolet light, emits second infrared light having a second wavelength range, wherein the first wavelength range of the first infrared light from the first luminescent material differs from the second wavelength range of the second infrared light from the second luminescent material, and the first luminescent material is arranged in a first planar area on the substrate, and the second luminescent material is arranged in a second planar area on the substrate, wherein the first planar area and the second planar area partially overlap each other, with the luminescent material comprising the first luminescent material and the second luminescent material each arranged to have a concentration gradation, such that an overlapping planar area of the luminescent material is formed, and wherein the concentration gradation of the first luminescent material in the luminescent material of the overlapping planar area gradually decreases in a direction from the first planar area toward the second planar area, while the concentration gradation of the second luminescent material in the luminescent material of the overlapping planar area gradually decreases in a direction from the second planar area toward the first planar area, wherein the first luminescent material and the second luminescent material comprise colorless luminescent material inks, which when irradiated with visible light, infrared light or ultraviolet light, emit the first and the second infrared lights but do not emit visible light;
   irradiating the luminescent medium with visible light, infrared light or ultraviolet light, emitted from an irradiation section, to cause the first luminescent material to emit the first infrared light having the first wavelength range and to cause the second luminescent material to emit the second infrared light having the second wavelength range; and
   reading the first infrared light and the second infrared light by an infrared detection section while moving the infrared detection section, which reads the first wavelength range of the first infrared light and the second wavelength range of the second infrared light, over the substrate in a direction from one of the first planar area and the second planar area toward the other.

8. A method for reading a luminescent medium, comprising the steps of:
   preparing a luminescent medium comprising: a substrate; and a luminescent material on the substrate, wherein the luminescent material comprises a first luminescent material which, when irradiated with visible light or ultraviolet light, emits first ultraviolet light having a first wavelength range, and a second luminescent material which, when irradiated with visible light or ultraviolet light, emits second ultraviolet light having a second wavelength range, wherein the first wavelength range of the first ultraviolet light from the first luminescent material differs from the second wavelength range of the second ultraviolet light from the second luminescent material, and the first luminescent material is arranged in a first planar area on the substrate, and the second luminescent material is arranged in a second planar area on the substrate, wherein the first planar area and the second planar area partially overlap each other, with the luminescent material comprising the first luminescent material and the second luminescent material each arranged to have a concentration gradation, such that an overlapping planar area of the luminescent material is formed, and wherein the concentration gradation of the first luminescent material in the luminescent material of the overlapping planar area gradually decreases in a direction from the first planar area toward the second planar area, while the concentration gradation of the second luminescent material in the luminescent material of the overlapping planar area gradually decreases in a direction from the second planar area toward the first planar area, wherein the first luminescent material and the second luminescent material comprise colorless luminescent material inks, which, when irradiated with visible light or ultraviolet light, emit the first and the second ultraviolet lights but do not emit visible light;

irradiating the luminescent medium with visible light or ultraviolet light to cause the first luminescent material to emit the first ultraviolet light having the first wavelength range and to cause the second luminescent material to emit the second ultraviolet light having the second wavelength range; and reading the first ultraviolet light and the second ultraviolet light by an ultraviolet detection section while moving the ultraviolet detection section, which reads the first wavelength range of the first ultraviolet light and the second wavelength range of the second ultraviolet light, over the substrate in a direction from one of the first planar area and the second planar area toward the other.

* * * * *